United States Patent Office 2,989,836
Patented June 27, 1961

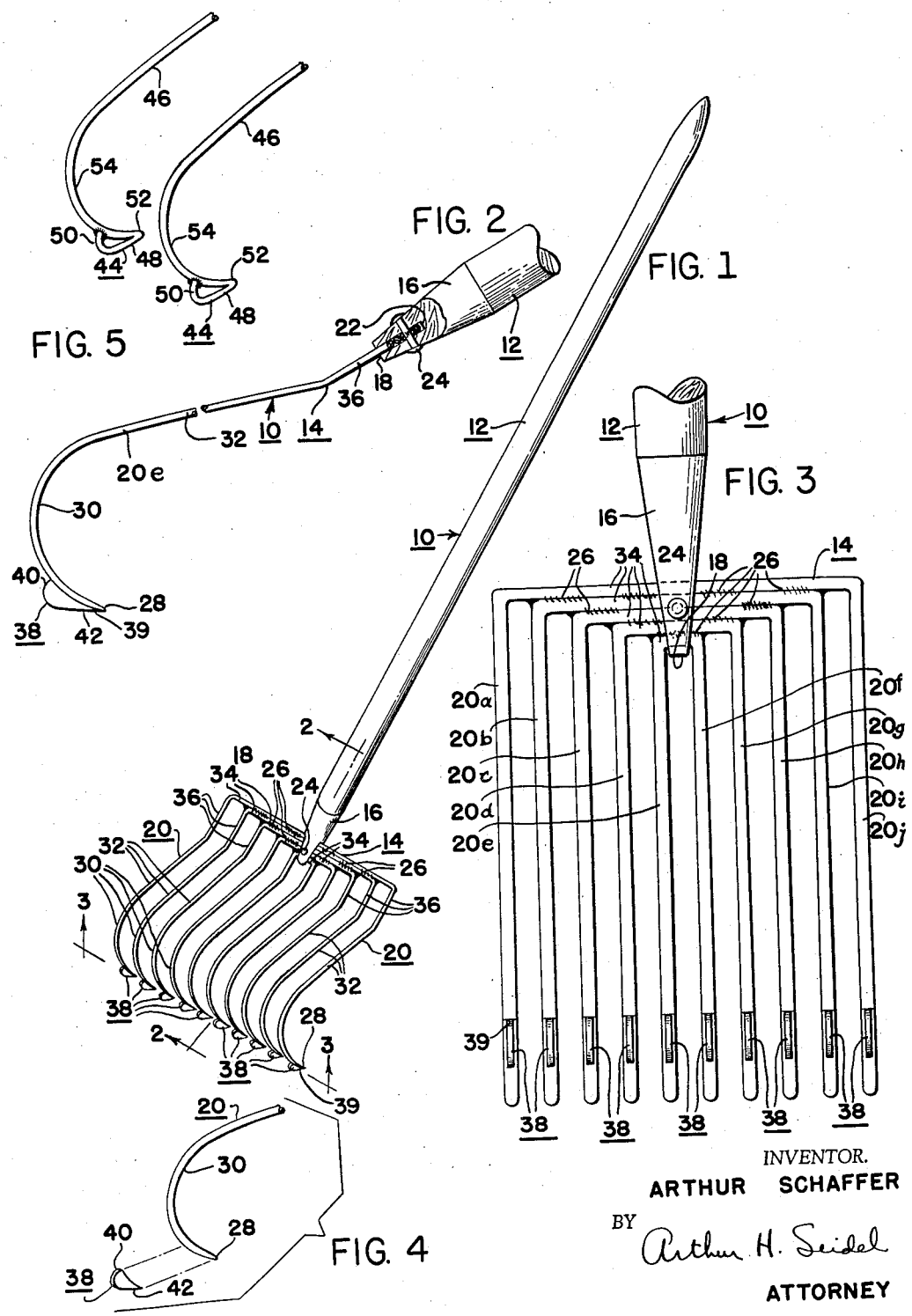

2,989,836
ALL-PURPOSE RAKE
Arthur Schaffer, Cleveland and Washington Aves.,
Riverside, N.J.
Filed Aug. 18, 1958, Ser. No. 755,757
4 Claims. (Cl. 56—400.15)

The present invention is directed to an all-purpose rake, and more particularly to an all-purpose rake which may be used for gathering leaves, hay, or stubble, and for stirring and spreading earth.

This invention has as an object the provision of a novel all-purpose rake.

This invention has as another object the provision of an all-purpose rake which possesses flexible teeth and which may be used for facile stirring and spreading.

This invention has as yet another object the provision of an all-purpose rake which may be used for gathering of leaves, hay, or stubble, without the leaves or the material being gathered being impinged upon the teeth of the rake.

This invention has as yet another object the provision of a light, relatively low cost, all-purpose flexible rake.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings, wherein like reference characters refer to like parts:

FIGURE 1 is a perspective view of the all-purpose rake of the present invention.

FIGURE 2 is a view taken on line 2—2 of FIGURE 1.

FIGURE 3 is a view taken on line 3—3 of FIGURE 1.

FIGURE 4 is an exploded view revealing the mode of manufacture of the all-purpose rake embodiment of FIGURE 1.

FIGURE 5 is a fragmentary view revealing another embodiment of the all-purpose rake of the present invention.

The all-purpose rake of the present invention is designated generally as 10. The rake 10 comprises the handle 12 and the head 14.

The handle 12 may comprise any conventional rake handle formed of wood or the like.

The head 14 is secured to the handle 12 in a conventional manner. Thus, the head 14 may comprise a frustoconical sleeve 16 which is press fitted onto the handle 12. The sleeve 16 may be formed of a cast metal, such as cast iron or the like.

The free end 18 of sleeve 16 is notched to receive the teeth 20 of the head 14. Thus, the teeth 20 are received wthin the notch 22, with the rivet 24 extending through the cluster of teeth 20 received within the notch 22 and through the sleeve 16.

The teeth 20 of head 14 comprise a plurality of generally U-shaped members which are bent to form the teeth in the manner set forth below. In the illustrated embodiment, shown in FIGURES 1 through 4 inclusive, five U-shaped teeth groups are shown consistng of the ten teeth 20a, 20b, 20c, 20d, 20e, 20f, 20g, 20h, 20i, and 20j. It is to be understood that a larger, or smaller number of teeth 20 may be used in the rake of the present invention. Thus, in the illustrated embodiment, teeth 20a and 20j comprise one U-shaped member, namely the outermost U-shaped member; teeth 20b and 20i comprise the next innermost U-shaped member; teeth 20c and 20h comprise the next innermost U-shaped member; teeth 20d and 20g comprise the next innermost U-shaped member; and the innermost U-shaped member consists of teeth 20e and 20f.

The five U-shaped teeth members are joined together at their cross elements, as by welding, brazing, or other metallurgical means. As illustrative of the weldment forming the head 14, reference to FIGURE 3 will reveal weld nuggets 26 which join the U-shaped members comprising the teeth together.

The description of tooth 20e will serve to clarify the structure of all of the teeth 20 of the head 14 of rake 10.

Tooth 20e is formed of flexible wire or rod material, such as spring steel. The tooth 20e should have sufficient resiliency so as to render the same useful for stirring and spreading operations, with the tooth 20e springing back to shape when the rake 10 is not in use. The tooth 20e is curved from its tip 28 to a point approximately one-third the way along its length to form a generally arcuate portion 30, which may be generally semi-circular. From the arcuate portion 30 the tooth extends for a considerable portion of its length along a straight line, such straight line portion being designated as the intermediate straight line portion 32. The portion of the tooth 20e adjacent its cross-member portion 34 comprises the straight line portion 36. Such straight line portion 36 comprises an extension of the longitudinal axis of handle 12.

The wedge runner 38 is secured to the underside of the arcuate portion 30 of tooth 20e adjacent its tip 28. As seen in FIGURE 4, the wedge runner 38 may comprise a separate member which is welded or otherwise metallurgically joined to the underside of the arcuate portion 30 of the tooth 20. Alternatively, the wedge runner 38 may be offset from the underside of the arcuate portion 30 and may be integral with the remainder of the tooth 20.

The wedge runner 38 tapers outwardly from its tip portion 39 which is disposed adjacent the tip 28 to its free edge portion, which in the illustrated embodiment comprises the arcuate free edge 40 which is opposed to the tip portion of the wedge runner 38. The underside 42 of wedge runner 38 is generally straight and disposed in the tangential plane of the underside of the tip 28.

The wedge runners 38 of the teeth 20 permit the teeth 20 to glide along the surface to which the rake 10 is applied. The teeth 20 being flexible may be moved over undulating supporting surfaces with accommodation to the variations in height in such supporting surfaces. The arcuate free edge 40, which may be semi-circular as shown in the drawings, permits the rake 10 to be pivoted slightly when the rake 10 is rested on such arcuate free edges. This facilitates the use of the rake 10 as a prying tool to remove pebbles and the like.

The rapid enlargement from the tip 28 to the arcuate free edge 40 of wedge runner 38 at the tip portion of the teeth 20 inhibits the impaling of leaves and the like upon the teeth 20 of the rake 10. This enables the rake 10 to be used for gathering leaves, paper, and the like without the inconvenience of the same being impaled upon the teeth 20 and the necessity for dislodging such impaled materials from the teeth 20.

In FIGURE 5 there is shown a modified embodiment of the rake 10 of the present invention in which the wedge runner 44 is integrally formed by bending the free end portion of each tooth 46 about itself, and welding or otherwise metallurgically joining the free end of the wedge runner 44 to the underside of the tooth 46, the undersurface 48 of the wedge runner 44 being flat, and the back edge 50 of the wedge runner 44 being arcuately curved. The tip 52 of each tooth 46 is formed between the undersurface 48 of the wedge runner 44 and the arcuate portion 54 of the tooth 46.

The shape of the teeth 46 of the embodiment of FIGURE 5, may generally resemble that of the teeth 20 of rake 10, the sole difference between the embodiment of FIGURE 5 and rake 10 being the manner in which the wedge runner for each tooth is formed.

The present invention may be embodied in other specific forms without departing from the spirit or essential attributes thereof and, accordingly, reference should be made to the appended claims, rather than to the foregoing specification as indicating the scope of the invention.

I claim:

1. An all-purpose rake comprising a rake head secured to the end of a handle, said rake head having a plurality of generally similar teeth of flexible rod elements extending therefrom, with each of said teeth comprising a curved portion adjacent its tip and an imperforate wedge runner fixedly secured beneath its tip, with the height of said wedge runner increasing from the tooth's tip to its portion which is furthest removed from the tooth's tip.

2. An all-purpose rake in accordance with claim 1 in which the wedge runner on each of the teeth has a generally straight underside which is disposed in the tangential plane of the underside of its tooth's tip.

3. An all-purpose rake in accordance with claim 2 in which the free edge portion of each tooth's wedge runner which is furthest removed from the tooth's tip is arcuately shaped.

4. An all-purpose rake in accordance with claim 1 in which each of the flexible rod-elements comprises a leg of a U-shaped member, with the bases of the U-shaped members making up the flexible rod elements being integrally secured together and received within a slot in the handle, and bolt means releasably securing said integrally secured bases to said handle.

References Cited in the file of this patent

UNITED STATES PATENTS

| | | |
|---|---|---|
| 757,123 | Kampfe | Apr. 12, 1904 |
| 788,261 | Idly | Apr. 25, 1905 |
| 1,239,735 | Smith et al. | Sept. 11, 1917 |
| 1,610,842 | Young | Dec. 14, 1926 |
| 2,083,922 | Roessel | June 15, 1937 |
| 2,423,772 | Haase | July 8, 1947 |

FOREIGN PATENTS

| | | |
|---|---|---|
| 108,118 | Australia | July 28, 1939 |